(12) United States Patent
Katiyar et al.

(10) Patent No.: US 12,098,324 B2
(45) Date of Patent: Sep. 24, 2024

(54) ENHANCED CRUDE OIL RECOVERY FROM SUBTERRANEAN CRUDE OIL-BEARING SANDSTONE RESERVOIRS

(71) Applicant: Dow Global Technologies LLC, Midland, MI (US)

(72) Inventors: Amit Katiyar, Lake Jackson, TX (US); Troy E. Knight, Lake Jackson, TX (US); Pramod D. Patil, Sugar Land, TX (US); Neeraj Rohilla, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 99 days.

(21) Appl. No.: 17/431,880

(22) PCT Filed: Feb. 17, 2020

(86) PCT No.: PCT/US2020/018486
§ 371 (c)(1),
(2) Date: Aug. 18, 2021

(87) PCT Pub. No.: WO2020/172087
PCT Pub. Date: Aug. 27, 2020

(65) Prior Publication Data
US 2022/0145163 A1    May 12, 2022

Related U.S. Application Data

(60) Provisional application No. 62/807,481, filed on Feb. 19, 2019.

(51) Int. Cl.
*C09K 8/584* (2006.01)

(52) U.S. Cl.
CPC .................... *C09K 8/584* (2013.01)

(58) Field of Classification Search
CPC .................................................. C09K 8/584
See application file for complete search history.

(56) References Cited

U.S. PATENT DOCUMENTS

| | | | |
|---|---|---|---|
| 4,828,031 A | 5/1989 | Davis | |
| 6,302,209 B1 | 10/2001 | Thompson et al. | |
| 8,210,263 B2 | 7/2012 | Quintero et al. | |
| 8,822,385 B2 | 9/2014 | Quintero et al. | |
| 9,074,123 B2 | 7/2015 | Hernández et al. | |
| 2011/0139669 A1* | 6/2011 | Huppert | A24F 25/00 206/524.1 |
| 2011/0319669 A1 | 12/2011 | Yu et al. | |
| 2013/0068457 A1 | 3/2013 | Thach et al. | |
| 2016/0311744 A1* | 10/2016 | Weerasooriya | C09K 8/584 |
| 2017/0321111 A1 | 11/2017 | Velez et al. | |
| 2019/0256763 A1 | 8/2019 | Grzesiak et al. | |

FOREIGN PATENT DOCUMENTS

| | | |
|---|---|---|
| CN | 102757317 A | 10/2012 |
| CN | 104559991 | 4/2015 |
| CN | 107787967 A | 3/2018 |

OTHER PUBLICATIONS

International Search Report & Written Opinion for related PCT Application PCT/US2020/018486, mailed May 13, 2020 (12 pgs).
International Preliminary Report on Patentability for related PCT Application PCT/US2020/018486, mailed Sep. 2, 2021 (7 pgs).
Al-Shalabi et al., "A comprehensive review of low salinity/ engineered water injections and their applications in sandstone and carbonate rocks," Journal of Petroleum Science and Engineering, Mar. 2016, pp. 137-161, vol. 139, The University of Texas at Austin, United States.

* cited by examiner

*Primary Examiner* — Aiqun Li

(57) ABSTRACT

The present disclosure provides for a sandstone-containing oil reservoir additive composition that includes (a) a nonionic wettability alteration agent having Formula (I): and (b) an injection fluid. For Formula (I), R is an alkyl residue from a branched secondary alcohol initiator, where R can have a carbon number of C4 to C10, x is from 3 to 10 and y is from 1 to 20. The injection fluid can be selected from the group consisting of sea water, engineered water, injection brine, produced brine or combinations thereof. The nonionic wettability agent in the sandstone reservoir additive composition can be from 0.01 weight percent (wt %) to 20 wt % based on the total weight of the sandstone reservoir additive composition. The sandstone-containing oil reservoir additive composition can be used in enhance oil recovery operations, such as a waterflooding operation or a carbon dioxide flooding operation.

7 Claims, No Drawings

ENHANCED CRUDE OIL RECOVERY FROM SUBTERRANEAN CRUDE OIL-BEARING SANDSTONE RESERVOIRS

This application is a National Stage Application under 35 U.S.C. § 371 of International Application Number PCT/US2020/018486, filed Feb. 17, 2020 and published as WO 2020/172087 on Aug. 27, 2020, which claims the benefit to U.S. Provisional Application 62/807,481, filed Feb. 19, 2019, the entire contents of which are incorporated herein by reference in its entirety

FIELD OF DISCLOSURE

The present disclosure relates to the recovery of crude oil. More particularly, the present disclosure provides for additives that support enhanced crude oil recovery from a subterranean crude oil-bearing sandstone reservoir.

BACKGROUND

Only a portion of crude oil originally present in a subterranean oil-bearing sandstone reservoir is recovered during a primary production process. Typical primary production processes include fluid and rock expansion, solution-gas drive, gravity drainage, and aquifer influx along with the reservoir's own natural energy to make the initial extraction of crude oil. To extract the remaining crude oil, an enhanced oil recovery (EOR) process such as a waterflooding process is used in the subterranean oil-bearing sandstone reservoir to increase the crude oil production. The waterflooding process injects water into the reservoir to increase and maintain the reservoir pressure at or near its initial level. The water used for waterflooding may be fresh water, saline water and/or brine recovered from the primary production process. During the waterflooding process the water displaces crude oil from pore spaces, but the effectiveness of waterflooding may depend at least on the wettability of the sandstone in the subterranean oil-bearing sandstone reservoir.

To help improve EOR, additives are used in conjunction with waterflooding to help alter the wettability and interfacial tension reduction of the sandstone inside the reservoir. Decreasing interfacial tension in the sandstone and shifting the sandstone wettability from an oil-wet towards a water-wet state are the main mechanisms these additives bring to EOR in waterflooding. Selecting the proper additive for the given oil reservoir structure (e.g., sandstone versus shale) allows for the pressure, temperature and salinity of the waterflooding to be more effective. Likewise, selecting the wrong additive for the waterflooding in the given crude oil reservoir structure can result in an ineffective EOR, even leading to damage to the reservoir due to undesirable wettability alteration and possible rock dissolution resulting in blockage of the pore space.

So, the rock mineralogy can play a significant role in EOR, where an improperly selected additive may result in high adsorption on the pore surface of the sandstone or rock, thereby wasting resources and money. Anionic based additives, for example, have been used with waterflooding in in sandstone-containing oil reservoirs. Unfortunately, such anionic additives are expensive. Accordingly, less costly additives are sought that can alter the wettability of sandstone reservoir rocks to enhance the effectiveness of EOR methods such as waterflooding.

SUMMARY

The present disclosure provides for a less costly additive that can alter the wettability of sandstone reservoir rocks to enhance the effectiveness of EOR methods such as waterflooding. Specifically, the present disclosure provides a sandstone-containing oil reservoir additive composition that includes (a) a nonionic wettability alteration agent having Formula (I):

$$R\text{—}O\text{—}(C_3H_6O)x\text{-}(C_2H_4O)y\text{-}H \qquad (I)$$

where R is an alkyl residue from a branched secondary alcohol initiator, and where R has a carbon number of C4 to C10, x is from 3 to 10, and y is from 1 to 20; and (b) an injection fluid. Preferably, the above variables can have the following values: R has a carbon number of C6 to C9; x is from 3 to 8 and y is from 5 to 20. For the various embodiments, the injection fluid is selected from the group consisting of sea water, engineered water, injection brine, produced brine or combinations thereof.

The embodiments herein also provide for the sandstone-containing oil reservoir additive composition in which the nonionic wettability agent in the sandstone reservoir additive composition is from 0.01 weight percent (wt %) to 20 wt % based on the total weight of the sandstone reservoir additive composition. The sandstone-containing oil reservoir additive composition can further include a hydrocarbon-based solvent selected from the group consisting of naphthene hydrocarbons, paraffin hydrocarbons, hexane or combinations thereof.

The present disclosure also provides for a method of enhanced oil recovery (EOR) from a sandstone-containing reservoir that includes mixing the nonionic wettability alteration agent with the injection fluid provided herein to form the sandstone-containing oil reservoir additive composition; injecting the sandstone-containing oil reservoir additive composition into a sandstone-containing oil reservoir; and extracting oil from the sandstone-containing oil reservoir. For the various embodiments, a temperature in the sandstone-containing oil reservoir is from 0 to 100° C. For the various embodiments, the EOR can be selected from the group consisting of a waterflooding operation and a carbon dioxide flooding operation for enhanced oil recovery.

DETAILED DESCRIPTION

The present disclosure provides for a less costly additive that can alter the wettability of sandstone reservoir rocks to enhance the effectiveness of enhanced oil recovery (EOR) methods such as waterflooding.

Definitions

As used herein, the term "subterranean crude oil-bearing sandstone reservoir" refers to a subterranean pool of hydrocarbons contained in a porous or fractured sedimentary rock formation.

As used herein, the term "crude oil" refers to a naturally occurring liquid consisting of a complex mixture of hydrocarbons of various molecular weights and structures, and other organic compounds, which are found in geological subterranean formations, such as in subterranean crude oil-bearing sandstone reservoirs. "Crude oil" is also known, and may be referred to herein, as petroleum and/or oil.

As used herein, the term "enhanced crude oil recovery" or "EOR" refers to the process(es) used after a primary and/or a secondary recovery processes is used, where the enhanced crude oil recovery helps to extract additional crude oil that could not otherwise be extracted from the subterranean crude oil-bearing sandstone reservoir.

As used herein, the term "waterflooding operation" for EOR refers to a process in which water is injected into a subterranean crude oil-bearing sandstone reservoir in order to increase the crude oil production.

As used herein, the term "water" can include, for example, a brine, a connate water, surface water, distilled water, carbonated water, sea/ocean water and a combination thereof. For brevity, the word "water" will be used herein (unless clearly indicated otherwise), where it is understood that one or more of "brine," "connate water," "surface water," "distilled water," "carbonated water," and/or "sea/ocean water" can be used interchangeably.

As used herein, "° C." is an abbreviation for degree Celsius.

Unless defined otherwise, all scientific and technical terms are understood to have the same meaning as commonly used in the art to which they pertain. For the purpose of the present disclosure, additional specific terms are defined throughout.

As used herein, parts-per-million (ppm) is used as one measure of concentration in which a given property exists at a relative proportion of one part per million parts examined, as would occur if a catalyst was present at a concentration of one-millionth of a gram per gram of reactants.

The terms "comprises," "includes" and variations of these words do not have a limiting meaning where these terms appear in the description and claims. Thus, for example, a process that comprises "a" sandstone-containing oil reservoir additive composition can be interpreted to mean a process that includes "one or more" sandstone-containing oil reservoir additive compositions. In addition, the term "comprising," which is synonymous with "including" or "containing," is inclusive, open-ended, and does not exclude additional unrecited elements or method steps.

As used herein, the term "and/or" means one, more than one, or all the listed elements.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the term "carbon dioxide flooding operation" for EOR refers to an injection process that introduces carbon dioxide gas into the subterranean crude oil-bearing sandstone reservoir, where the carbon dioxide allows for the miscible displacement of the crude oil due to the reduction in the crude oil viscosity for the given reservoir temperature, pressure and crude oil composition.

The present disclosure provides a sandstone-containing oil reservoir additive composition that includes (a) a nonionic wettability alteration agent having the following Formula I:

$$R\text{—}O\text{—}(C_3H_6O)x\text{-}(C_2H_4O)y\text{-}H \quad (I)$$

where R is an alkyl residue from a branched secondary alcohol initiator, and where R has a carbon number of C4 to C10, x is from 3 to 10, and y is from 1 to 20; and (b) an injection fluid.

In Formula I, R is an alkyl residue from a branched secondary alcohol initiator. In general, the branched secondary alcohol initiator is a compound containing 4 to 10 carbon atoms (C4 to C10). In some embodiments, R preferably has a carbon number of C6 to C9. Most preferably, the embodiments include examples where R has a carbon number of C8 to C9. The R group can further have a branching degree of 2 or more. In some embodiments, the branching degree is 3 or more. The term "branching degree" as used herein means the total number of methyl (—CH₃) groups minus 1. For instance, if there are four methyl groups, then the branching degree is 3. In some embodiments, R contains at least 2 methyl groups. Examples of suitable branched secondary alcohol initiators include 4-methyl-2-pentanol (MIBC), 2,6,8-trimethyl-4-nonanol, 2,6-dimethyl heptan-4-ol (DIBC) and the Tergitol™ 15-S series available from The Dow Chemical Company.

The nonionic wettability alteration agent of Formula I can also have a narrow molecular weight distribution, represented by the materials' polydispersity index (weight average molecular weight/number average molecular weight (Mw/Mn) as determined by gel permeation chromatography). A narrow molecular weight distribution generally results in better surfactant performance. In some embodiments, the polydispersity index (PDI) of the nonionic wettability alteration agent of Formula I is 2.0 or less, alternatively 1.75 or less, alternatively 1.5 or less, alternatively 1.2 or less, or alternatively 1.15 or less.

In addition to exhibiting low PDI, in some embodiments, the nonionic wettability alteration agent of Formula I may also be prepared as described herein to contain low levels of residual unreacted alcohols. The advantages of having low levels of alcohols include enhanced surface activity, low odor, and improved clarity of aqueous formulations. In some embodiments, the compositions of the nonionic wettability alteration agent of Formula I contains 10 weight percent or less, alternatively 5 weight percent or less, alternatively 3 weight percent or less, alternatively 2 weight percent or less, alternatively 1 weight percent or less, or alternatively 0.5 weight percent or less of residual alcohols.

The nonionic wettability alteration agent of Formula I also includes variables "x" and "y", as provided above. These variables describe the molar amount of charged propylene oxide and ethylene oxide used in making the nonionic wettability alteration agent of Formula I. For Formula I, x has a value from 3 to 10. Preferably, x is from 3 to 8. Most preferably, x is from 4 to 6. In addition, y has a value from 1 to 20. Preferably, y is from 5 to 20. Most preferably, y is from 5 to 15.

The nonionic wettability alteration agent of Formula I can be formed in a number of ways. For example, a branched secondary alcohol initiator as provided herein can be reacted with propylene oxide and ethylene oxide, under alkoxylation conditions in the presence of a catalyst. Propylene oxide and/or ethylene oxide can be utilized to form the nonionic wettability alteration agent of Formula I by random and/or block addition, where for random addition a mixture of both the propylene oxide and ethylene oxide are present with the initiator and for block addition the initiator reacts first with one oxide (e.g., propylene oxide) and then with the other (e.g., ethylene oxide) or where the initiator first reacts with a first oxide (e.g., propylene oxide) followed by random addition where the initiator reacts with a mixture of the propylene oxide and ethylene oxide.

The catalyst used for the alkoxylations can be, for example, a double metal cyanide compound or potassium hydroxide, as are known in the art. Prior to the alkoxylation reaction, it may be advantageous to dry the branched secondary alcohol initiator in order to reduce its water content. Various techniques May be used, including, for instance application of reduced pressure, elevated temperature, nitrogen purge, or a combination of these. The water content may be reduced to, for example, 300 ppm or less, alternatively 200 ppm or less, or alternatively 100 ppm or less, or alternatively 50 ppm or less, or alternatively 25 ppm or less.

The propylene oxide and ethylene oxide are reacted with the branched secondary alcohol initiator under alkoxylation conditions. In a non-limiting embodiment illustrative of suitable alkoxylation conditions, this reaction may be carried out at an elevated temperature or temperatures ranging from about 80° C. to about 180° C. In other non-limiting embodiments, the temperature may range from about 100° C. to about 160° C. Pressures from about 14 psia to about 60 psia may, in certain non-limiting embodiments, be particularly efficacious, but other pressures may also be effectively employed. Those skilled in the art will be able to determine appropriate conditions with, at most, routine experimentation.

Preferably, the alkoxylation reaction is conducted in the presence of an effective amount of a double metal cyanide compound as catalyst. The amount of the catalyst may, in some embodiments, range from about 1 ppm to about 1000 ppm by weight, based on the total charge of alcohol and oxides. In some embodiments, the amount may range from about 10 ppm to about 300 ppm. Suitable double metal cyanide catalysts include those described in U.S. Pat. No. 6,429,342, which is incorporated herein by reference. By way of example, $Zn_3[Co(CN)_6,]_2$ may be used as the catalyst.

In a typical illustrative process, the catalyst may be dissolved or dispersed in the dried alcohol or, alternatively, the two may be mixed first and then the alcohol dried, e.g., using the techniques discussed above, to reduce the residual water content. The propylene oxide and ethylene oxide may then be added, and the reaction continued until a desired level of alkoxylation has occurred. In some embodiments, the propylene oxide and the ethylene oxide may instead be added in a batch manner, such as through two, three, or four charges throughout the reaction process. The reaction may be subjected to digestion periods (e.g., about 1-10 hours at about 100° C. to 160° C.) between propylene oxide and/or ethylene oxide additions and/or after the final propylene oxide and/or ethylene oxide addition.

Following the alkoxylation reaction, the nonionic wettability alteration agent of Formula I may be discharged from the reactor without removal of the catalyst. If desired; the product may be filtered prior to use, or treated by different means to remove or recover the catalyst, such as taught in U.S. Pat. Nos. 4,355,188; 4,721,818; 4,877,906; 5,010; 047; 5,099,075; 5,416,241, each of which is incorporated herein by reference.

The nonionic wettability alteration agent of Formula I may also be subjected to additional purification steps. For instance, in some embodiments, the level of residual alcohol may be further reduced by heating the crude ethoxylated product at elevated temperature, such as 120° C. or greater, alternatively 150° C. or greater. In addition, in some embodiments, a vacuum may be applied, e.g., 250 Torr or less, or 200 Torr or less, or 150 Torr or less, such that the boiling point of any residual alcohol is exceeded. An inert gas, such as nitrogen, may be flowed over (head-space sparge) or through (sub-surface sparge) the product to further facilitate removal of the alcohol. Combinations of the foregoing techniques may be applied.

The sandstone-containing oil reservoir additive composition further includes (b) an injection fluid. For the various embodiment, the injection fluid is selected from the group consisting of sea water, engineered water, injection brine, produced brine or combinations thereof.

In an additional embodiment, the sandstone-containing oil reservoir additive composition can further include a hydrocarbon-based solvent selected from the group consisting of naphthene hydrocarbons, paraffin hydrocarbons, hexane or combinations thereof.

Embodiments of the present disclosure also include examples where the nonionic wettability agent in the sandstone reservoir additive composition is from 0.01 weight percent (wt %) to 20 wt % based on the total weight of the sandstone reservoir additive composition. The embodiments include examples where the nonionic wettability agent in the sandstone reservoir additive composition is from 0.05 wt % to 5 wt % based on the total weight of the sandstone reservoir additive composition. The embodiments include examples where the nonionic wettability agent in the sandstone reservoir additive composition is from 0.1 wt % to 1 wt % based on the total weight of the sandstone reservoir additive composition. The embodiments include examples where the nonionic wettability agent in the sandstone reservoir additive composition is from 0.1 wt % to 0.5 wt % based on the total weight of the sandstone reservoir additive composition.

The present disclosure also includes a method of enhanced oil recovery from a sandstone-containing reservoir. The method includes mixing the nonionic wettability alteration agent with the injection fluid, as provided herein, to form the sandstone-containing oil reservoir additive composition; injecting the sandstone-containing oil reservoir additive composition into a sandstone-containing oil reservoir; and extracting oil from the sandstone-containing oil reservoir.

As used herein, the nonionic wettability alteration agent of Formula I is amphiphilic, meaning it contains both hydrophobic groups (e.g., from R) and hydrophilic groups (derived from the propylene oxide and ethylene oxide groups), which allows the nonionic wettability alteration agent to be soluble in both organic solvents (non-polar) and polar solvents such as water. For example, the nonionic wettability alteration agent used in the sandstone-containing oil reservoir additive compositions of the present disclosure may lower the interfacial tension between carbon dioxide (such as carbon dioxide in a supercritical state) and water. The nonionic wettability alteration agent is capable of dissolving in supercritical carbon dioxide in dilute concentrations, where they can help to stabilize carbon dioxide-in-water emulsions and/or foams (referred to herein as "emulsion"), as discussed herein.

As discussed herein, embodiments of the present disclosure include examples where the injection fluid is selected from the group consisting of carbon dioxide, nitrogen, a hydrocarbon, water, or combinations thereof. The embodiments include examples where the method is included in a waterflooding operation for enhanced oil recovery (EOR). The embodiments include examples where the method is included in a carbon dioxide flooding operation for EOR.

Both operations for EOR noted above are known in the art. For example, the methods of the present disclosure include injecting the sandstone-containing oil reservoir additive composition into a flow of carbon dioxide being injected into a sandstone-containing oil reservoir, where an emulsion of the carbon dioxide and the sandstone-containing oil reservoir additive composition can form in an aqueous solution in the sandstone-containing oil reservoir. In one or more embodiments, the aqueous solution in the sandstone-containing oil reservoir can include water, as defined herein, that has been injected, or introduced, into the sandstone-containing oil reservoir.

In one or more embodiments, the sandstone-containing oil reservoir additive composition of the present disclosure can be introduced into the flow of carbon dioxide, where the carbon dioxide and the sandstone-containing oil reservoir additive composition are then injected into the sandstone-containing oil reservoir. In one or more embodiments, to 100 parts per million to 5,000 parts per million of the sandstone-containing oil reservoir additive composition can be introduced into the flow of carbon dioxide. Other ranges are possible, where the selection of the concentration of the sandstone-containing oil reservoir additive composition introduced into the flow of carbon dioxide can depend upon the physical and chemical conditions present in the sandstone-containing oil reservoir.

Carbon dioxide ($CO_2$) can exist in four distinct phases depending upon its temperature and pressure. The four phases are as a solid, a liquid, a vapor (or gas), and a supercritical fluid. A supercritical fluid is a defined state of a compound, mixture or element above its critical pressure and critical temperature. The supercritical fluid may behave as a liquid with respect to density, while behaving like a vapor with respect to viscosity. Carbon dioxide as a supercritical fluid is stable above a critical pressure of 6.9 megapascal (MPa) and a critical temperature of 31° C. For one or more embodiments of the present disclosure the carbon dioxide can be in a fluid state either as a liquid and/or as a supercritical fluid. As such, "carbon dioxide" and/or "supercritical carbon dioxide", both used herein, are considered to be in a supercritical state that can vacillate between a supercritical phase and a liquid phase depending on the temperature.

The flow of carbon dioxide may be provided to the sandstone-containing oil reservoir via an injection well, e.g., a wellbore. The sandstone-containing oil reservoir may include a plurality of injection wells. The pressure utilized to inject the carbon dioxide at a given rate can be a function of sandstone-containing oil reservoir parameters that include, but are not limited to, permeability, zone thickness, and a bottom-hole pressure exerted by a column of the carbon dioxide in the wellbore. For one or more embodiments, the flow of carbon dioxide to the sandstone-containing oil reservoir can be at a pressure of from 800 pound-force per square inch (5516 kPa) to 3000 pound-force per square inch (20684 kPa). For some applications, the flow of carbon dioxide may be provided to the sandstone-containing oil reservoir at a pressure that can be greater than a miscibility pressure of a particular sandstone-containing oil reservoir. Miscibility pressure refers to the minimum pressure at which the carbon dioxide and the oil in the sandstone-containing oil reservoir are miscible. The miscibility pressure may vary due, at least in part, to the chemical makeup of the oil in the sandstone-containing oil reservoir and/or the sandstone-containing oil reservoir temperature.

For one or more embodiments, the flow of carbon dioxide to the sandstone-containing oil reservoir can be at a temperature of 25° C. to 70° C. For one or more embodiments, the flow of carbon dioxide to the sandstone-containing oil reservoir can be at a temperature of 25° C. to 100° C. As such, the carbon dioxide can be in a fluid state that vacillates between a supercritical phase and a liquid phase. In addition, the flow of carbon dioxide and the sandstone-containing oil reservoir additive composition can be injected into the sandstone-containing oil reservoir, where the carbon dioxide and the nonionic surfactant form an emulsion in the aqueous solution in the sandstone-containing oil reservoir. The embodiments include examples where a temperature in the sandstone-containing oil reservoir is from 0 to 100° C. The embodiments include examples where a temperature in the sandstone-containing oil reservoir is from 20 to 80° C. The embodiments include examples where a temperature in the sandstone-containing oil reservoir is from 20 to 70° C.

The carbon dioxide, which is much less viscous than oil or water, may move faster in some regions and directions than others to create viscous fingers through which a significant portion of the injected fluids may flow. Some of these fingers may arrive prematurely at a production well; lowering the effectiveness of both the injected carbon dioxide and of the production well's pumping capacity. Additionally, gravity separation of the water and carbon dioxide can result in gravity override, where denser water flows in a lower zone of the sandstone-containing oil reservoir and the less dense carbon dioxide flows in an upper zone of the sandstone-containing oil reservoir. The use of an emulsion (e.g., an emulsion of carbon dioxide/water) helps reduce viscous fingering and/or gravity override that may result, at least in part, due to the relative lower viscosity and density of the carbon dioxide. Moreover, since fluids flow preferentially into areas of high permeability in the sandstone-containing oil reservoir, and emulsion formation is proportional to flow, the emulsion may greatly increase local resistance to flow preferentially in the high permeability zone, thereby diverting injected fluids to areas of lower permeability and improving process efficiency for the oil recovery.

In one or more embodiments, the sandstone-containing oil reservoir additive compositions discussed herein can be injected with and into the supercritical carbon dioxide being pumped into the sandstone-containing oil reservoir containing oil. When injected with the supercritical carbon dioxide the sandstone-containing oil reservoir additive compositions can help promote the formation of an emulsion of carbon dioxide and water. It is preferable to inject the sandstone-containing oil reservoir additive compositions into the supercritical carbon dioxide, as opposed to injecting into or with water, for at least two reasons. First, in order to achieve an emulsion the carbon dioxide, sandstone-containing oil reservoir additive compositions and water must be present in intimate contact within the sandstone-containing oil reservoir where the carbon dioxide is flowing. If the sandstone-containing oil reservoir additive compositions were dissolved in the water there is a greater likelihood that these two components will tend to the bottom regions (e.g., the water being more dense than the carbon dioxide will tend to the lower points) of the sandstone-containing oil reservoir, while the carbon dioxide being relatively less dense will tend to the upper regions of the formation. This allows for a condition referred to as "gravity override," where the carbon dioxide flows over the top of the water with the dissolved nonionic surfactant. As such, the components do not meet creating very little, if any, emulsion in the desired locations within the sandstone-containing oil reservoir. Second, carbon dioxide tends to have more mobility in the sandstone-containing oil reservoir where it can meet and form an emulsion with the water. This also allows for an emulsion to be formed in more locations within the sandstone-containing oil reservoir, which can be important when long term mobility control is desired.

With respect to enhanced oil recovery operations, in one or more embodiments the sandstone-containing oil reservoir additive compositions of the present disclosure can be injected into supercritical carbon dioxide that is being supplied through piping. In one embodiment, the sandstone-containing oil reservoir additive compositions can be injected into the supercritical carbon dioxide using an injector. Examples of suitable injectors for this purpose include those disclosed in U.S. Pat. No. 9,545,606 entitled "Solubilizing Surfactants into Supercritical Carbon Dioxide for Enhanced Oil Recovery", which is incorporated herein by reference in its entirety.

For the various embodiments, the sandstone-containing oil reservoir additive compositions of the present disclosure can be injected into the supercritical carbon dioxide at a concentration of 100 to 5000 parts-per-million, where the sandstone-containing oil reservoir additive compositions is soluble in the supercritical carbon dioxide. As appreciated, other values for the concentration of the sandstone-containing oil reservoir additive compositions injected into the supercritical carbon dioxide are possible. For example, considerations for determining these other concentration values can include, but are not limited to, the flow rates of the supercritical carbon dioxide, the solubility of the nonionic surfactant in the supercritical carbon dioxide, and/or the effectiveness of the nonionic surfactant in forming an emulsion with the supercritical carbon dioxide.

The nonionic wettability alteration agent can also be used with other nonionic surfactants for use with the sandstone-containing oil reservoir additive compositions of the present disclosure. Such additional nonionic surfactants include, but are not limited to, ethoxylated aliphatic alcohols, polyoxyethylene, carboxylic esters, polyethylene glycol esters, anhydrosorbitol ester and ethoxylated derivatives, glycol esters of fatty acids, carboxylic amides, monoalkanolamine condensates, polyoxyethylene fatty acid amides, branched alkylphenol alkoxylates, linear alkylphenol alkoxylates, and branched alkyl alkoxylates.

Although embodiments described herein include supercritical carbon dioxide as the noncondensable gas in compositions of the present disclosure, one skilled in the art will appreciate that other noncondensable gases may also be included in place of supercritical carbon dioxide and/or in addition to supercritical carbon dioxide. Examples of other possible noncondensable gases include, but are not limited to, nitrogen, natural gas, methane, propane, butane, ethane, ethylene, hydrogen sulfide, carbonyl sulfide, air, combustion flue gas, mixtures of methane with ethane, argon, light hydrocarbons, and mixtures thereof, among others.

In some embodiments, compositions of the present disclosure can include other additives. For example, the composition can include corrosion inhibitors, co-surfactants, scale inhibitors, mixtures thereof, as well as other additives. In some embodiments, the total amount of the additives added to the compositions of the present disclosure is not greater than about 5 weight percent, based on a total weight of the composition.

The following examples are illustrative of the invention but are not intended to limit its scope. Unless otherwise indicated, the ratios, percentages, parts, and the like used herein are by weight.

EXAMPLES

Table 1 shows the structures of the non-ionic wettability alteration agents used in the present Examples. Each is commercially available from Sigma-Aldrich unless otherwise noted. All tests were done at room temperature (23° C.) unless otherwise noted.

TABLE 1

Compounds used in Examples

| Comparative Example/ Example | Alcohol Initiator (R Group) | Hydrophobe Type | Compound Structure |
|---|---|---|---|
| Comparative Example A (CE A) | 1-Nonanol (C9) | Linear Alcohol Hydrophobe | $(C_9H_{19})$—O—$(C_3H_6O)_5$—$(C_2H_4O)_{10}$—H |
| CE B | 1-Hexanol (C6) | Linear Alcohol Hydrophobe | $(C_6H_{13})$—O—$(C_3H_6O)_5$—$(C_2H_4O)_{10}$—H |
| CE C | TERGITOL ™ 15-S-20 | Non-Ionic Surfactant | |
| CE D | TERGITOL ™ 15-S-15 | Non-Ionic Surfactant | |
| Example 1 (EX 1) | 2,6-dimethyl-4-heptan-4-ol (DIBC) | Branched secondary alcohol hydrophobe DIBC + 5PO + 10EO | $H_3C$—CH(CH_3)—CH_2—CH(—O—$(C_3H_6O)_5$—$(C_2H_4O)_{10}$—H)—CH_2—CH(CH_3)—CH_3 |
| EX 2 | 4-methyl-2-pentanol (MIBC) | Branched secondary alcohol hydrophobe MIBC + 5PO + 10EO | $H_3C$—CH(CH_3)—CH_2—CH(CH_3)—O—$(C_3H_6O)_5$—$(C_2H_4O)_{10}$—H |

Prepare a Synthetic Brine (an example of an injection fluid) by dissolving appropriate amounts of sodium chloride, magnesium chloride and calcium chloride in deionized water that represents reservoir salinity. For example purposes, 5033 ppm of total dissolved salts were used in this disclosure.

Dissolve each of the non-ionic wettability alteration agent in Table 1 in the Synthetic Brine to a concentration of either 2000 ppm or 1000 ppm of the non-ionic wettability alteration agent to form the Example and Comparative Example. Perform the following Tests using the Example and Comparative Example, where the results are seen in Table 2.

Static Adsorption Test

Prepare a sieved rock sample by crushing and sieving a Berea Sandstone Core™ (Berea Sandstone Petroleum Cores), where resulting sandstone granules having a size greater than 300 micrometer (μm) and less than 600 μm form the sieved rock sample. For each Example 1 (EX 1, concentration 2000 ppm), EX 2 (concentration 2000 ppm), Comparative Example A (CE A, concentration 2000 ppm) and CE B (concentration 2000 ppm) see in Table 2, place 10 grams (g) of the sieved rock sample in a glass vial and add 25 g of EX 1, EX 2, CE A or CE B, as discussed above. Shake the bottle gently and withdraw 1 g aliquots of the Synthetic Brine at 0 hours (hr), 24 hr, 48 hr, 120 hr, 240 hr and 480 hr. Analyze each aliquot of the Synthetic Brine samples using high pressure liquid chromatography (HPLC) to measure the amount of wettability alteration agent remaining in Synthetic Brine at the various aliquot times. This data provides information about the maximum possible wettability alteration agent adsorption to the sand granules.

HPLC is a 1260 Infinity II HPLC having a 1290 Infinity II ELSD detector, both from Agilent Technologies. Operate the detector at an evaporation temperature of 80° C., a nebulizer Temperature of 80° C. and with a nitrogen gas flow rate of 0.90 standard litre per minute (SLM). Solvents are E-pure water and acetonitrile. Column is a ZORBAX Eclipse Plus C8, 3×150 mm, 3.5 μm having an operation temperature of 40° C. Injection volume is 3-5 μL, depending on the concentration of surfactants where if the salinity is greater than 5.0%, a one-to-one dilution with E-pure Water is required to prevent salt build-up in the ELSD. Operate the quaternary pump at a flow rate of 0.62 mL/min and a pressure of 0-450 bar. Run lengths are 15.10 minutes+9.00 minutes Post Time (24.01 minutes total) with the gradient solvent composition as follows:

Gradient (Solvent Composition):

| Time | % E-Pure Water | % Acetonitrile |
|---|---|---|
| 0.00 | 95 | 5 |
| 1.00 | 95 | 5 |
| 1.01 | 60 | 40 |
| 9.00 | 20 | 80 |
| 9.01 | 0 | 100 |
| 15.00 | 0 | 100 |
| 15.01 | 95 | 5 |

Table 2 reports the results of the static adsorption test for EX 1, EX 2, CE A and CE B. For an economical field implementation, wettability alteration agent adsorption should be preferably less than (<) 0.5 mg/g of sandstone granules and more preferably <0.1 mg/g of sandstone granules.

Contact Angle

Perform the contact angle tests using EX 1, EX 2, CE A and CE B according to the following procedure. Measure the contact angle of each sample on Teflon using a Krüss Model DSA-100 Drop Analyzer. Place a specific amount of sample (a 0.1 wt % solution in water) on a piece of Teflon tape at a drop deposition rate of 6.32 μt/min. Record the contact angle immediately after the drop completely deposited on the Teflon tape. Determine for each drop the left and right contact angles by the DSA software. Take the mean as the contact angle.

Prepare both a 2000 ppm and a 1000 ppm concentration of the non-ionic wettability alteration agent in the Synthetic Brine. Next, measure the contact angle for a 1 ml sample of each of the Synthetic Brine (Control), EX 1 (2000 ppm and 1000 ppm), EX 2 (2000 ppm and 1000 ppm), CE A (2000 ppm and 1000 ppm) and CE B (2000 ppm and 1000 ppm) of the non-ionic wettability alteration agent in the Synthetic Brine. Measure contact angles for Synthetic Brine (Control) and the Synthetic Brine having a concentration of either 2000 ppm or 1000 ppm of the non-ionic wettability alteration agent of EX 1, EX 2, CE A or CE B.

Table 2 reports contact angle for a drop of the Synthetic Brine and the Synthetic Brine having either 2000 ppm or 1000 ppm of the non-ionic wettability alteration agent of EX 1, EX 2, CE A or CE B on a hydrophobic surface (i.e., Parafilm M plastic paraffin film) to analyze the efficacy of the non-ionic wettability alteration agent in changing the wettability from an oil hydrophilic state to a water-wet state. The contact angle of the Synthetic Brine only without dissolved non-ionic wettability alteration agent on parafilm is in the range of 100° to 160°. Table 2 shows that the non-ionic wettability alteration agent lowers the contact angle of the Synthetic Brine drop on the hydrophobic surface from more than 90° to less than 90°, which qualifies it as a good wettability altering agent.

TABLE 2

| Example/ Comparative Example | Non-ionic Wettability Alteration Agent | Contact Angle (°), 1000 ppm | Contact Angle (°), 2000 ppm | Stock for static adsorption (ppm) | Adsorption (mg/g) on Berea Sandstone Granules at 2000 ppm |
|---|---|---|---|---|---|
| Synthetic Brine | — | >90° | >90° | — | — |
| CE A | C9 + 5PO + 10EO | 56.3 | 56.3 | 2000 | 0.64 |
| EX 1 | DIBC + 5PO + 10EO | 55.4 | 51.2 | 2000 | 0.2 |
| CE B | C6 + 5PO + 10EO | 83.0 | 78.9 | 2000 | 0.46 |
| EX 2 | MIBC + 5PO + 10EO | 81.9 | 79.2 | 2000 | 0.25 |
| CE C | TERGITOL ™ 15-S-20 | 75.5 | — | 2000 | 0.93 |
| CE D | TERGITOL ™ 15-S-15 | 69.9 | — | 2000 | 1.01 |

Table 2 reports the contact angle and the static adsorption data with EX 1, EX 2, CE A and CE B of the non-ionic wettability alteration agent. Table 2 also shows baseline adsorption of typical wettability alteration surfactants (CE C-CE E) on Berea sandstone rock. With adsorption about 1 mg/g, the issue of using typical wettability alteration surfactants (CE C-CE E) for wettability alteration on sandstone rock is clearly seen.

With respect to the present Examples, both CE A and EX 1 of the non-ionic wettability alteration agents are C9 alcohol hydrophobes having the same number of groups derived from propylene oxide (PO) and ethylene oxide (EO). Both show a contact angle of less that 90° confirming the significant wettability altering efficacy of these non-ionic wettability alteration agents. The difference between these non-ionic wettability alteration agents, however, is seen in their adsorption on the sandstone granules, where EX 1 with its secondary branched C9 hydrophobe structure shows less than 3 times the adsorption (0.2 mg/g of sandstone granules) as compared to the linear C9 hydrophobe structure (0.64 mg/g of sandstone granules).

Similarly, both CE B and EX 2 of the non-ionic wettability alteration agents are C6 alcohol hydrophobes having the same number of groups derived from propylene oxide (PO) and ethylene oxide (EO). Both show a contact angle of less that 90° confirming the significant wettability altering efficacy of these non-ionic wettability alteration agents. The difference between these non-ionic wettability alteration agents, however, is seen in their adsorption on the sandstone granules, where EX 2 with its secondary branched C6 hydrophobe structure shows less than 1.8 times the adsorption (0.25 mg/g of sandstone granules) as compared to the linear C6 hydrophobe structure (0.46 mg/g of sandstone granules).

The above data suggest that for enhanced oil recovery operations (e.g., waterflooding) it would be more economical to use a nonionic wettability alteration agent having an alkyl residue from a branched secondary alcohol initiator, as provided herein, as compared to an alkyl residue from a linear secondary alcohol initiator.

What is claimed is:

1. A sandstone-containing oil reservoir additive composition, comprising:
   (a) a nonionic wettability alteration agent having Formula (1):

$$R-O-(C_3H_6O)x-(C_2H_4O)y-H \quad (I)$$

wherein R is an alkyl residue from a branched secondary alcohol initiator, wherein:
   R is a C6 alkyl residue having a branching degree of 2;
   x is from 5 to 8; and
   y is from 5 to 20; and
   (b) an injection fluid selected from the group consisting of sea water, engineered water, injection brine, produced brine or combinations thereof.

2. The sandstone-containing oil reservoir additive composition of claim 1, wherein the nonionic wettability agent in the sandstone reservoir additive composition is from 0.01 weight percent (wt %) to 20 wt % based on the total weight of the sandstone reservoir additive composition.

3. The sandstone-containing oil reservoir additive composition of claim 1, further including a hydrocarbon-based solvent selected from the group consisting of naphthene hydrocarbons, paraffin hydrocarbons, hexane or combinations thereof.

4. The sandstone-containing oil reservoir additive composition of claim 1, wherein x is from 5 to 6.

5. A method of enhanced oil recovery from a sandstone-containing reservoir, comprising:
   mixing the nonionic wettability alteration agent with the injection fluid of claim 1 to form the sandstone-containing oil reservoir additive composition;
   injecting the sandstone-containing oil reservoir additive composition into a sandstone-containing oil reservoir; and
   extracting oil from the sandstone-containing oil reservoir.

6. The method of claim 5, wherein a temperature in the sandstone-containing oil reservoir is from 0 to 100° C.

7. The method of claim 5, wherein the enhanced oil recovery is selected from the group consisting of a waterflooding operation and a carbon dioxide flooding operation for enhanced oil recovery.

* * * * *